(12) United States Patent
Gruenberg et al.

(10) Patent No.: US 6,382,134 B1
(45) Date of Patent: May 7, 2002

(54) FISH REARING SYSTEM

(75) Inventors: Daniel Edward Gruenberg, St. Paul, MN (US); Shinji Morimura, Tokyo (JP); Shinichiroh Kawaguchi, Kawaguchi (JP); Akio Minami, Kumagaya (JP)

(73) Assignees: Jifas Corporation; Hitachi Metals, Ltd., both of Tokyo (JP)

( * ) Notice: Subject to any disclaimer, the term of this patent is extended or adjusted under 35 U.S.C. 154(b) by 0 days.

(21) Appl. No.: 09/048,336

(22) Filed: Mar. 26, 1998

Related U.S. Application Data

(63) Continuation of application No. PCT/JP97/02628, filed on Jul. 29, 1997.

(30) Foreign Application Priority Data

Jul. 30, 1996 (JP) ............................................. 8-200839

(51) Int. Cl.[7] .............................................. A01K 61/00
(52) U.S. Cl. ...................................................... 119/215
(58) Field of Search ................. 119/201, 215, 119/230, 231

(56) References Cited

U.S. PATENT DOCUMENTS

| | | | | |
|---|---|---|---|---|
| 3,661,262 A | * | 5/1972 | Sanders | 210/169 |
| 3,741,158 A | * | 6/1973 | Moe, Jr. et al. | 119/268 |
| 3,765,372 A | * | 10/1973 | Moe, Jr. et al. | 119/215 |
| 4,297,973 A | * | 11/1981 | Knowles | 119/215 |
| 5,353,745 A | * | 10/1994 | Fahs, II | 119/226 |
| 5,732,655 A | * | 3/1998 | Baba et al. | 119/230 |
| 5,961,831 A | * | 10/1999 | Lee et al. | 119/230 |

* cited by examiner

Primary Examiner—Thomas Price
(74) Attorney, Agent, or Firm—Kanesaka & Takeuchi

(57) ABSTRACT

A fish rearing system having a water circulation system comprising: a trapping section including a particle trap 2 for capturing residual feed and fish feces contained in the water, a sediment trap 6 for accumulating a sediment in a rearing tank and separating the sediment from the water, a residual feed detecting sensor 5 interposed in a pipe 4 communicating with the particle trap 2 and the sediment trap 6, and a micro-screen filter 7; a denitrification device 12 for denitrifying a nitrogen compound dissolved and contained in the water; a bubble surfacing device 11 for generating bubbles by supplying air and/or ozone and removing surface active substances contained in the water by capturing the bubbles; an ultraviolet disinfection device 13 for disinfecting the circulating rearing water; an ammonium treatment section consisting of a immersion treatment device 15 and a non-immersion treatment device 14 and having a function of decomposing ammonium contained in the water; and an aeration device 21 for dissolving oxygen into the water; wherein the denitrification device 12 is disposed at the upstream of the bubble surfacing device 11 and includes a bypass pipe 10. Thus, the fish rearing system capable of performing water quality control at a low cost can be obtained by a rational combination of devices.

6 Claims, 4 Drawing Sheets

FISH REARING SYSTEM

CROSS-REFERENCE TO RELATED APPLICATIONS

This is a continuation of international application PCT/JP97/02628, filed Jul. 29, 1997, which designated the United States and is now abandoned.

TECHNICAL FIELD

This invention relates to a fish rearing system having a water circulation system for circulating the rearing water in a fish rearing water tank, and, particularly to a fish rearing system capable of performing water quality control at a low cost by a rational combination of devices.

BACKGROUND ART

Conventionally known fish rearing system is generally comprising a water circulation system for discharging the rearing water from a discharge port provided at the bottom of a rearing water tank and re-supplying the discharged water to the rearing water tank.

Since the fish rearing system of this type is designed to rear fish in the rearing water tank, a special consideration is given to contamination of the water caused by the metabolism of fish. Thus, the heretofore proposed art has concentrated on how efficiently the water contamination can be removed within a limited space of the rearing water tank, the water circulation system and the like.

In order to improve the efficiency of the fish rearing system by removing the water contamination and regulating the rearing environment, the fish rearing system generally includes a filter device for capturing residual feed and fish feces contained in the water, an aeration device for supplying oxygen to the rearing water, an ammonium treating device for treating ammonium generated during rearing, or an ozone supplying section.

In performing water quality control of the fish rearing system, it is particularly important to control contents of salt, mineral, residual feed and fish feces, protein and ammonium, and to treat nitrogen dioxide, nitrogen dioxide, carbon oxide and oxygen which are generated during decomposition process of the above-mentioned substances. For example, it is known that ammoniac nitrogen is harmful to fish. It is observed that when the ammoniac nitrogen content in the rearing water exceeds 3 ppm, certain kinds of fish lose their eating activity sharply. Although it is known that a content of nitrogen nitrate generated during nitrifyingly decomposition of ammoniac nitrogen is not so harmful to fish, an acceptable tolerance for fish rearing is limited to the range of from 50 ppm to 500 ppm, though the tolerance depends on different kinds of fish.

Fish feces, an organic substance such as protein, and ammonium produced by a biological metabolism of fish and residual feed are particularly giving a great effect to increase water contamination, and these ill-effect elements are removed by various treatment device, or purified by the metabolism function of microorganisms which are present in the water circulation path. For an index of water contamination, the term of "biochemical oxygen demand (hereinafter referred to as "BOD")" is generally used. The BOD represents an amount of oxygen (mg/l) dissolved and contained in the water which is consumed by proliferation activity or breathing function of bacteria which are present in the water.

For example, a nitrogen compound (ammoniac nitrogen, nitrite-nitrogen, nitrate-nitrogen), which is generated by the metabolism of fish and which is one of elements to be limited in biological production, is purified by utilizing the metabolism function of, so-called denitrification bacteria and nitrification bacteria, such as, aerobic microorganisms or anaerobic microorganisms present in the water circulation path. Ammoniac nitrogen ($NH_4$—N) is biologically oxidized by nitrification of aerobic microorganisms and turned into nitrite-nitrogen or nitrate-nitrogen ($NO_2$—N, or $NO_3$—N), and biologically reduced further to nitrogen-oxide gas ($NO_2$) or nitrogen gas ($N_2$) by anaerobic bacteria. During this process, anaerobic bacteria require the presence of an organic carbon source serving as a hydrogen supply body for acquiring the energy required for biological reduction.

In the case where the metabolic function of bacteria is utilized, it is necessary that a physiological activities should be taken into consideration so that the metabolism of microorganisms can be effected under the suitable condition.

For example, in nitrification of ammoniac nitrogen ($NH_4$—N), a nitrification rate reaches to about 100% when a BOD load is low, but the nitrification rate is rapidly lowered when the BOD load approaches a certain value. Further, it is known that, in denitrification of nitrite-nitrogen or nitrate-nitrogen ($NO_2$—N or $NO_3$—N), the higher the BOD load, the faster the denitrification speed. In other words, a value of BOD load suitable for nitrification action and a value of BOD for denitrification are the conditions contrary to each other.

Further, in this type of fish rearing system, if, for example, removal of water contaminants and regulation of the rearing environment can be effected simultaneously by a single treatment section, such a system is desirable for saving energy of the rearing system. Also, it is necessary for each treatment device to make a correction or complementary treatment of the treatment made by the other treatment section.

In view of the above-described situation, it is an object of the present invention to provide the fish rearing system capable of performing water quality control at a low cost by a rational combination of devices.

DISCLOSURE OF THE INVENTION

This invention relates to a fish rearing system having a water circulation system for discharging the rearing water from a discharge port provided at the bottom of a rearing water tank and re-supplying the discharged rearing water to the rearing water tank, characterized in that the water circulation system comprising: a trapping device for capturing residual feed and fish feces contained in the rearing water, a residual feed detecting sensor for detecting the residual feed contained in the rearing water, a denitrification device for denitrifies a nitrogen compound contained in the rearing water, a bubble surfacing device for generating bubbles by supplying air and/or ozone and removing surface active substances by capturing the generated bubbles, an ultraviolet disinfection device for disinfecting the circulating rearing water, an ammonium treating section for decomposing ammonium contained in the rearing water, and an aeration section for dissolving oxygen into the rearing water, and wherein the denitrification device is disposed at the upstream of the bubble surfacing device and in a circulation path branched out from a main circulation path.

Before effecting any/all water quality controls, it is required to provide the trapping device for capturing residual feed and fish feces contained in the water. Detection of residual feed contained in the water allows to make an adjustment of amount of feed to increase or decrease thereof.

The denitrification device is required to decompose nitrite-nitrogen, which is the final product of ammonium, into nitrogen gas. The supply of air is not only desirable for regulation of the rearing environment, but the supply of air and/or ozone is effective in that it generates bubbles, and organic substances such as fatty acid and protein adhered to bubbles can be removed by capturing bubbles. The ultraviolet disinfection device disinfects germs contained in the water which cause illness to fish. This device also decomposes ozone contained in the rearing water by irradiation of ultraviolet rays. Further, the ammonium treatment device is required for performing a purification treatment of ammonium generated by physiological activities of fish and which is one of elements to cause water contamination. The aeration device is for dissolving oxygen in the water which is vital to keep the fish alive.

By disposing the denitrification device at the upstream of the bubble surfacing device as described above, an organic carbon source, which is necessary for denitrification by anaerobic bacteria, can be provided by organic substances contained in the circulating water. Therefore, this can save time and labor of adding additives to supply the organic substances required for denitrification, or even if such adding of the additives is required, it is sufficient to add a small amount of additives. This allows to effect the denitrification treatment efficiently and less costly, which, in turn, allows to perform the quality control of the water efficiently. Further, by disposing the denitrification device in the branched water circulation passage, reducing the amount of water flowing through the branched water circulating passage, and prolonging the time for the water residing in the denitrification device, the denitrification can be achieved to a satisfactory level. That is, this causes the lack of the absolute amount of dissolved oxygen in the denitrification device so that the inside thereof easily becomes the anaerobic state, in which the anaerobic bacteria become active to effect denitrification more efficiently.

Further, with the present invention, the above-described ammonium treatment device is disposed at the downstream of the bubble surfacing device, and comprising two treatment device of a immersion treatment device and a non-immersion treatment section.

By disposing the ammonium treatment section at the downstream of the bubble surfacing device, the rearing water from which protein and the like have been removed is communicated with the ammonium treatment section. Thus, the load in the ammonium treatment device is reduced, and decomposition of ammonium is promoted. Further, the ammonium treatment section comprises two treatment sections, one of which is the non-immersion treatment device where a contact area with the air is larger, thereby to facilitate the use of oxygen contained in the air. This allows to reduce an amount of use of an expensive oxygen, and, at the same time, a high content of ammonium in the rearing water flowing from the upstream can be decomposed to a certain degree first in the non-immersion treatment device, then decomposed to a further low content in the immersion treatment device. Thus, it is possible to improve the efficiency of ammonium decomposition than that of a one-stage ammonium treatment.

Moreover, with the present invention, the trapping device is comprising a particle trap provided at the bottom of the rearing water tank and in which the sediment containing residual feed and fish feces is accumulated; a sediment trap for separating the sediment, which has flown in through the circulating passage branched from the particle trap, from the water; and a filter section for catching minute residual feed and other residual feed which have escaped the particle trap and the sediment trap and are still contained in the water. In addition, the residual feed detecting sensor is an ultrasonic sensor which is disposed at the upstream of the sediment trap and interposed in the water circulating passage branched from the particle trap and communicating with the sediment trap.

As described above, with the present invention, the sediment including residual feed and fish feces can be caught by the particle trap, the sediment trap and the filter device, and the solid substances can be removed from the rearing water, thereby the rearing water in a clean condition can be circulated. Further, a specific ultrasonic sensor is used for the residual feed sensor, so that the residual feed can be easily detected from the sediment which is a muddy mixture of residual feed and fish feces. A detection result of the residual feed is provided to an external computer, so that the feeding rate can be easily controlled. By disposing the residual feed detection sensor in the circulating passage branched from the particle trap, a quantity of the flow of the water flowing through this branched circulating passage is reduced, and a flow velocity may be delayed by providing a water retention section and the like in the circulating passage. Then, the residual feed contained in the water, which flows slowly and in a small quantity of flow, can be determined easily, thereby to improve the detection accuracy of the residual feed detection sensor.

Moreover, with the fish rearing system of the present invention, the denitrification device and the immersion treatment device each includes a fluidized bed filter, the non-immersion treatment device includes a rotary bio-contactor tank, and the aeration device includes a pressure dissolving device or a hollow fiber membrane module.

The fluidized bed filter used in the denitrification device and the immersion treatment device contains therein bacteria, and the ammonium contained in the rearing water is decomposed by the bacteria. Further, by providing the rotary bio-contactor tank to the non-immersion treatment device, the area for contacting with the air is made larger so as to use the oxygen contained in the air effectively for conducting the treatment. Also, by providing the pressure dissolving device or the hollow fiber membrane module in the aeration device, the oxygen is supplied through fine pores of the hollow fiber membrane, specifically, the oxygen is jet out from the fine pores, so that the oxygen can be efficiently dissolved in the water. Thus, it lowers the cost than the use of liquid oxygen.

Moreover, in the fish rearing system of the present invention, the ultraviolet disinfection device is disposed at the downstream of the bubble surfacing device.

With such arrangement of disposing the ultraviolet disinfection device at the downstream of the bubble surfacing device, germs contained in the rearing water which cause illness to fish can be subjected to disinfection treatment. Further, in the bubble surfacing device, the supplied ozone can be decomposed. It is not desirable to have the ozone in high concentration dissolved in the water, because the aerobic bacteria which make the nitrification in the ammonium treatment section are killed, and the presence of high concentration of ozone is also harmful to fish. However, the ozone can be decomposed by the ultraviolet disinfection device, thereby to allow regulation of an amount of ozone.

As described above, the fish rearing system of the present invention is specifically structured by taking into consideration the opposing BOD load conditions in the nitrification treatment and denitrification treatment. Specifically, the nitrification is performed in the ammonium treatment device provided in the main water circulation passage at the downstream of the bubble surfacing device, and the denitrification is performed in the denitrification device interposed in the branched water circulating passage at the upstream of the bubble surfacing device with respect to the above-described main water flow passage.

With the present invention, the trapping device for catching residual feed and fish feces and the bubble surfacing device are provided at the upstream of the ammonium treatment section. Thus, by utilizing both the trapping section and the bubble surfacing device, the solid organic substances and organic substances dissolved in the water can be removed to the order of 90%, and nitrification in the ammonium treatment device, which is adapted to remove ammoniac nitrogen, can be effected more effectively. Specifically, in the ammonium treatment device provided in the main water circulation passage, the organic substances (residual feed, fish feces, protein which has been physiologically excreted by fish, and the like) which are the major factor of the BOD load can be removed to the utmost extent by a physical treatment prior to nitrification treatment, so that the nitrification can be performed effectively. Also, in the denitrification device provided in the branched water circulating passage at the upstream of the bubble surfacing device, the denitrification treatment can be conduced effectively with the water from which the organic substances have not been removed, namely, with the organic substances present in the water, without adding additional organic substances, or even when such adding of organic substances is required, a small amount of addition of organic substances is sufficient. The inside of denitrification device, where the denitrification treatment effected by anaerobic bacteria, is required to be kept in the anaerobic condition. However, when the full quantity of flow, or a flow close to the full quantity of flow, of the rearing water circulating with the dissolved residual oxygen in a relatively high concentration is communicated with the denitrification device, the inside of the denitrification device becomes the aerobic condition due to the oxygen contained in the water and the activity of anaerobic bacteria is obstructed. To avoid this, with the fish rearing system of the present invention, the denitrification device is provided in the water circulation passage branched from the main circulation passage so as to lower the quantity of flow of rearing water for flowing through the denitrification device. Thus, the anaerobic condition of the inside of the denitrification device can be maintained due to the lack of the absolute oxygen amount, which, in turn, promotes the activity of bacteria, resulting in purification of the rearing water.

Since the high purity oxygen is expensive, the utilization of oxygen contained in the air effectively at each treatment section leads to reduction of the costs. Specifically, in the ammonium treatment section where the ammoniac nitrogen is treated, not only the ammoniac nitrogen is treated, but also organic substances which are inevitably contained in the rearing water can be oxidized. To deal with this situation, the non-immersion treatment device having a larger area to contact with the air is disposed at the upstream where the BOD load becomes higher due to organic substances unavoidably contained in the rearing water, so as to use the oxygen contained in the air to the greatest extent to perform nitrification treatment and removal of organic substances. Consequently, the amount of consumption of expensive oxygen is reduced, thereby the costs are lowered. In addition, the immersion treatment device is disposed at the downstream of the non-immersion treatment device, where the contact ratio with bacteria is increased and the concentration of ammoniac nitrogen is lowered.

As described above, according to the present invention, the fish rearing system capable of performing the quality control of the water at a lower cost can be provided by a streamlined combination of various installations.

BEST MODE OF CARRYING OUT THE INVENTION

The present invention will be described based on an embodiment shown in the accompanying drawings.

Figure 1:
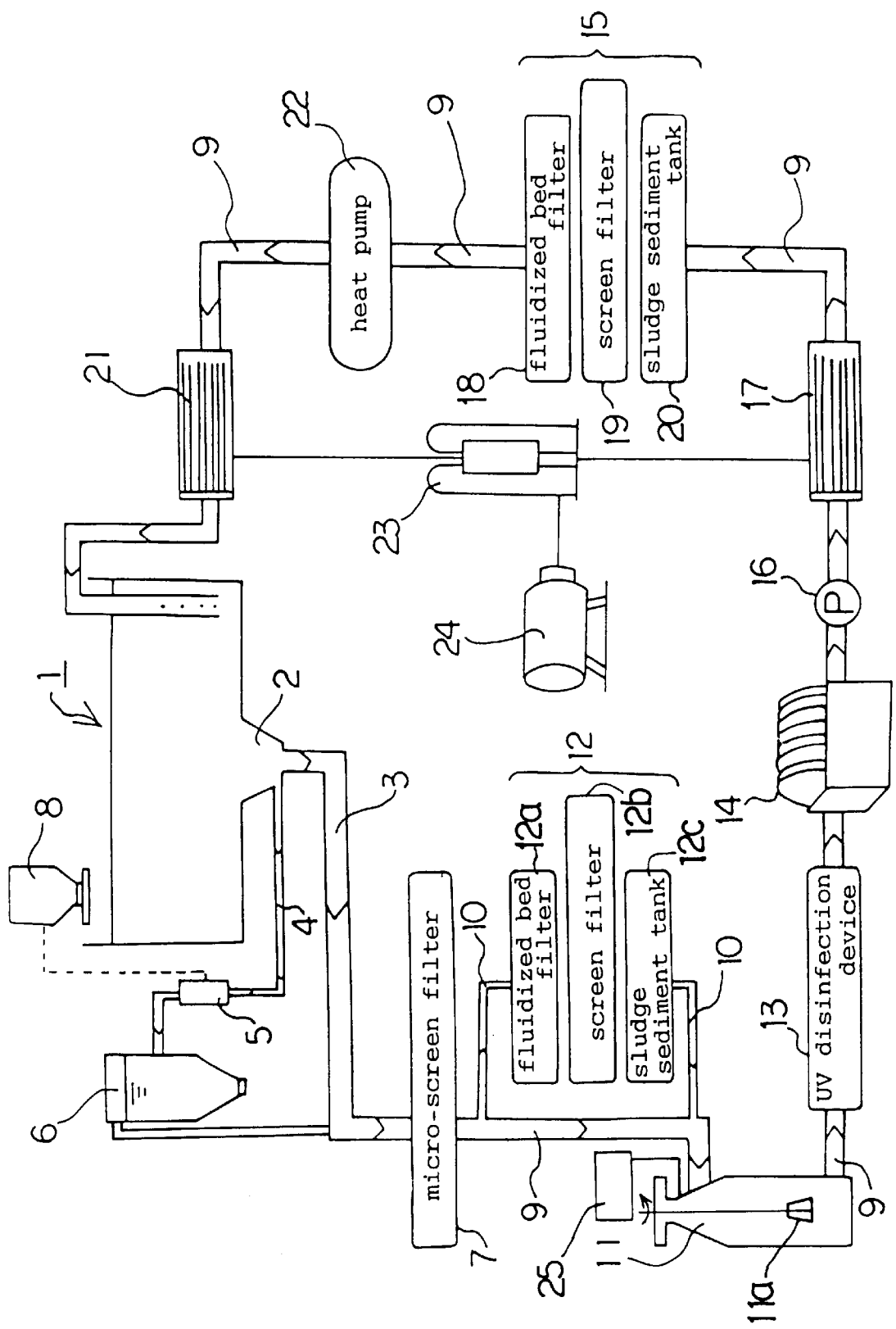
FIG. 1 illustrates an entire structure of an embodiment of the fish rearing system of the present invention.

FIG. 1 illustrates an entire structure of an embodiment of the fish rearing system of the present invention.

In FIG. 1, the fish rearing system of this embodiment includes a particle trap 2 disposed at the bottom of a rearing water tank 1, and two pipes 3, 4 are provided extending from and communicating with the particle trap 2.

The particle trap 2 is formed in a reversed-cone shape chamber around the pipe 3 serving as an outlet for the main flow of the rearing water, so that sediment particles of residual feed and fish feces are settled in the chamber, and the sediment particles are discharged through the pipe 4 disposed to across a moving direction of particles.

Sediment particles captured in the particle trap 2 pass through the pipe 4, and after passing through a residual feed detection sensor 5, which will be described hereinafter and which is interposed in the pipe 4, will finally flow into a sediment trap 6. For the sediment trap 6, a cyclone separator may be used, for example. The pipe 4 is so configured that a flow rate of water passing therethrough is less than that of the pipe 3. For example, a flow rate of about 1%–5% of the full quantity of flow of the rearing water flows through the pipe 4. About 90% of the sediments of residual feed and fish feces contained in the water are captured in the particle trap 2, and carried over to the sediment trap 6 by way of the pipe 4. In the sediment trap 6 the sediments are separated from the water according to the different specific gravity, and subjected to a separate treatment.

Next, the method of controlling supply of feed will be described which is made based on a detection result provided by the residual feed detection sensor 5, which detects the residual feed and fish feces contained the rearing water, will be described. According to the present invention, for example, a feed supply device 8 is operated intermittently (e.g. for a predetermined time at predetermined intervals) to supply the feed to the rearing water tank 1, and an amount of residual feed in the rearing water is detected at the time of supplying the feed, thereby to control the supply of feed based on the detection result.

Figure 2:
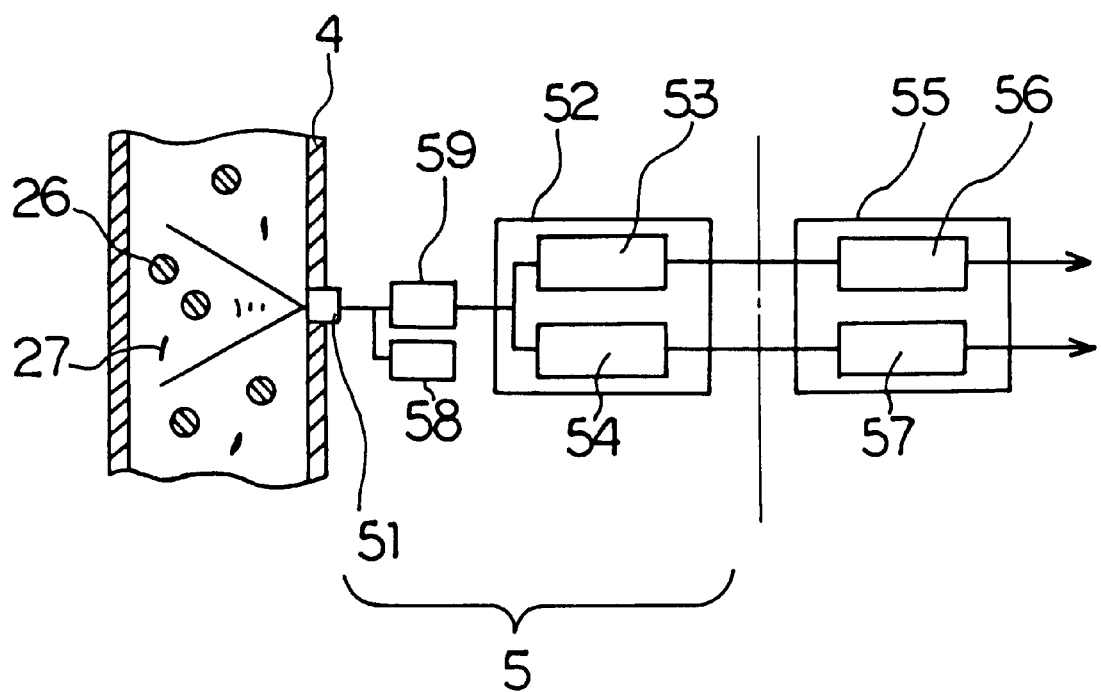
FIG. 2 is a schematic structural view of the residual feed detection sensor with a partially sectional view of the pipe in the fish rearing system of the present invention.

FIG. 2 is a schematic structural view of the residual feed detection sensor 5.

As shown in FIG. 2, the residual feed detection sensor 5 comprises a transmitter 58 for transmitting a high frequency burst signal which has been power amplified to a predetermined power; an oscillator 51 disposed at the inner circumferential surface of the pipe 4 for subjecting the burst signal to an electric/acoustic conversion and transmitting the converted signal to the pipe 4 and subjecting the reflecting signals from the residual feed or fish feces to an acoustic/electric conversion; a receiver 59 for receiving the converted electric signal, amplifying it to a desired level and outputting the amplified signal to a signal processing circuit section 52 where the electric signal amplified by the receiver 59 is processed; and wherein the signal is further processed based on the signal processed in the signal processing circuit 52 which is connected with, for example, a control circuit section 55 which outputs a control signal to an externally provided computer system. The signal processing circuit section 52 comprises a residual feed detection circuit 53 for processing the signal reflected by a residual feed 26 and a fish feces detection circuit 54 for processing the signal reflected by fish feces 27. The control circuit section 55 comprises a residual feed detection pulse circuit 56 and a fish feces detection pulse circuit 57, both of which output a control signal based on the electric signal outputted from each circuit forming the signal processing circuit 52. The electric signal processed in the control circuit 55 is outputted to a computer system (not shown) operated externally of to the circulation section, the supply of feed is controlled by the computer system based on the aforementioned signal, and a proper amount of feed is supplied from the feed supply section 8.

Figure 3:
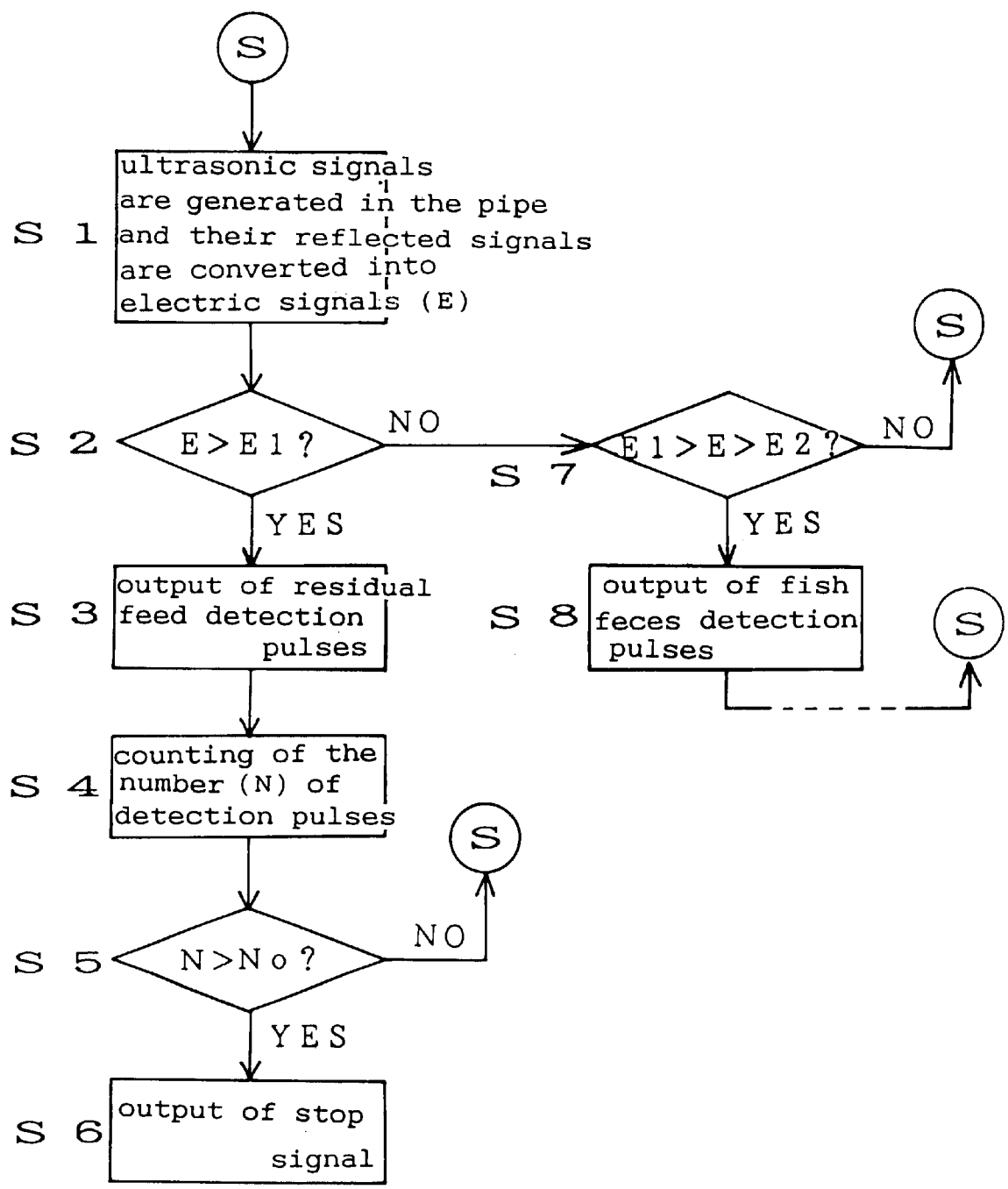
FIG. 3 is a flow-chart of the residual feed detection sensor.

FIG. 3 is a flow-chart of the detection method of the residual feed detection sensor 5.

Figure 4:
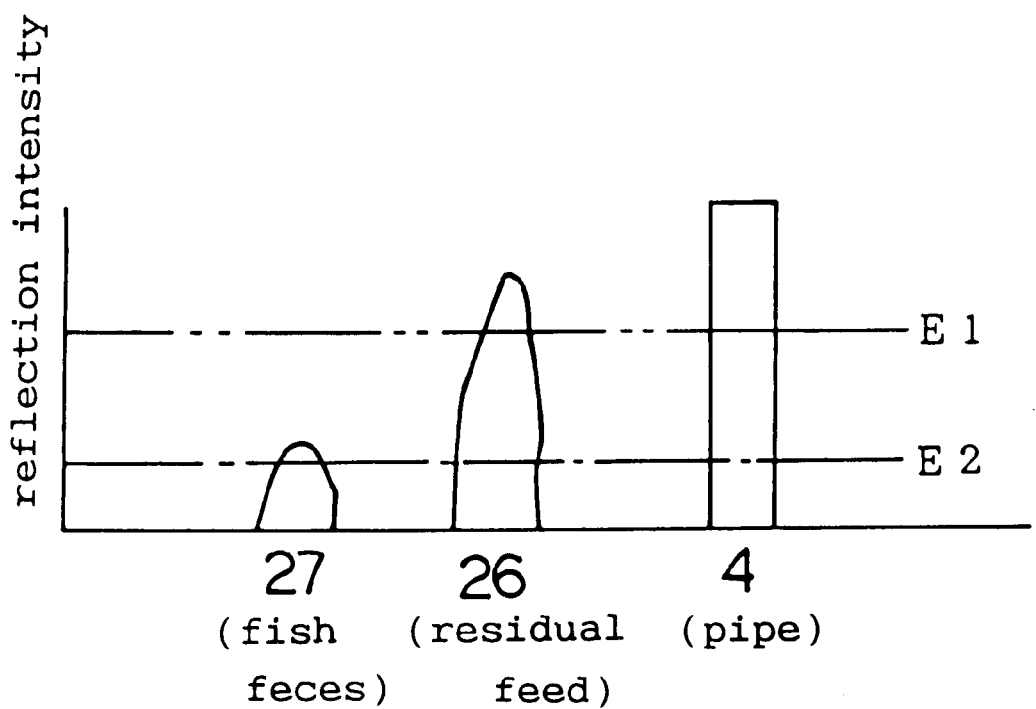
FIG. 4 shows the reflection intensities of signals of fish feces, residual feed and the inner surface of pipe.

The burst signal transmitted from the transmitter 58 is converted into an acoustic (ultrasonic) signal by the oscillator 51, and the converted signal is, then, transmitted to the pipe 4. The acoustic signal transmitted to the pipe 4 is reflected by the residual feed 26 and the fish feces 27 contained in the rearing water passing through the pipe 4 and also reflected by the inner surface of the pipe 4. The signals thus reflected are received again by the oscillator 51, and converted into an electric signal E (S1). The converted electric signal E is received by the receiver 59. The reflected signals are represented as pulses. The reflection intensity of the signal reflected by each matter differs by different matters which reflect the signal, and the intensity becomes higher in the order of the fish feces 27, the residual feed 26 and the inner surface of the pipe 4 (see FIG. 4).

In the receiver 59, an amplification factor is so set that the difference between the reflection intensity of the residual feed and that of the fish feces becomes maximum. The electric signal E outputted from the receiver 59 (S1) is compared with a reference value E1 which is the detection level of the residual feed detected by the residual feed detection circuit 53 (S2), and if the electric signal E is greater than the reference value E1 (E>E1), the residual feed detection pulses are outputted to the control circuit 55 (S3). The residual feed detection pulses are counted in the residual detection pulse processing circuit 56 (S4), and a counted result N is compared with a reference value No corresponding to the level of the proper amount of residual feed (S5). When the counted result N is higher than the reference value No, a stop signal is outputted to the computer system (not shown) (S6).

On the other hand, the electric signal E outputted from the receiver 59 (S1) is compared with a reference value E2 which is the detection level of the fish feces detected by the fish feces detection circuit 54, and when the electric signal E is greater than the reference value E2 and smaller than the reference value E1 (E1>E>E2) the fish feces detection pulses are outputted to the control circuit 55 (S8), and, again, the above step (S1) will be performed continuously.

As described above, the residual feed detection sensor utilizes the difference in reflection intensity of the acoustic (ultrasonic) signals from the residual feed and the fish feces to distinguish the residual feed from the fish feces, so that the amount of residual feed can be detected accurately. As described above, in the pipe 4, the rearing water of small quantity of flow containing the sediments flows through the residual feed detection sensor 5, and by providing a flow delaying section in the residual feed detection sensor 5 to delay the flow rate, the residual feed contained in the water which flows slowly and in the small flow rate can be determined, thereby to improve the detection accuracy of the residual detection sensor 5. Then, based on the information detected by the residual feed detection sensor 5, the supply of feed to the rearing water tank 1 from the feed supply device 8 is stopped by the computer operated outside the circulation section.

Moreover, the rearing water in the sediment trap 6 flows again through the pipe 4 to a micro-screen filter 7. The rearing water in the particle trap 2 also flows through the pipe 3 to the micro-screen filter 7. Here, in the microscreen filter, the remaining fine sediments of about 10% which escaped the particle rap 2 and the sediment trap 6 are captured. For this purpose, a resin cloth filter having a pore size of 10–100 micro m (preferably less than 50 micro m), for example, may be used for the micro-screen filter 7.

As described above, the trapping section includes the particle trap 2, the sediment trap 6 and the micro-screen filter 7, and the sediments of residual feed and the like contained in the rearing water are captured by the trapping section to keep the circulating water clean, thereby to lower the load of the water treatment system. In addition, by providing the residual feed detection sensor 5 disposed in the pipe 4, the feed supply device 8 and the computer system, the amount of residual feed can be accurately detected from the rearing water containing the residual feed and the fish feces in the mixed state, so that the supply of feed can be made properly.

The rearing water which has passed through the micro-screen filter 7 flows into a bubble surfacing device 11 through a pipe 9. A bypass pipe 10 is branched from the pipe 9 at the up-stream of the bubble surfacing device. A denitrification device 12 is provided to the bypass pipe 10, and it is so designed that the rearing water which has passed through the denitrification device 12 joins with the rearing water passing through the pipe 9, and flows together into the bubble surfacing device 11. The bubble surfacing device 11 includes an agitating blade 11a having bubble generating means, which is connected with, for example, a discharge-type ozonizer 25. Bubble generating means may be provided separately from the agitating blade.

As described above, a portion of the rearing water is directly communicated with the bubble surfacing device 11 through the pipe 9, and other portion of the rearing water is communicated with the denitrification device 12 through the bypass pipe 10.

The bypass pipe 10 is so designed that the quantity of flow of the water which passes therethrough is smaller than that of the water passing through the pipe 9. For example, the rearing water of the quantity of flow rate in the order of 1%–10% of the full quantity of flow passes through the bypass pipe 10 and the denitrification device 12. The quantity flow of the rearing water which passes through the denitrification device 12 through the bypass pipe 10 is determined based on the size of the entire rearing system including the size of the rearing water tank 1.

The denitrification device 12 has the function to perform the reduction of nitrite-nitrogen and nitrate-nitrogen contained in the rearing water by the anaerobic bacteria to decompose them into nitrogen gas. The anaerobic bacteria require an organic carbon source to serve as a hydrogen supply body in order to acquire the energy necessary for the reduction. The denitrifi-cation device 12 includes a fluidized bed filter 12a as in the case of a immersion processing device 15 which will be described hereinafter.

The denitrification device 12 is disposed at the upstream of the bubble surfacing device 11, and, consequently, the rearing water, from which the organic substances have not been removed, passes through the denitrification device 12. Thus, the anaerobic bacteria, which perform the denitrification, can easily obtain the organic carbon source required for decomposition from the organic substances contained in the water. Therefore, this can save time and labor of adding additives to supply the organic substances material required for denitrification, or even if adding of the additives is required, it is sufficient to add a small amount of additives. Thus, the denitrification treatment can be made efficiently and less costly, which, in turn, allows to perform the quality control of the water efficiently.

If the full quantity of flow of the rearing water containing a high concentration of oxygen remained therein flows into the denitrification device 12, the inside of the denitrification device 12 becomes the aerobic state and denitrification function is lowered. To avoid this, the bypass pipe 10 branched from the pipe 9 is disposed through the denitrification device 12 so that the rearing water in small quantity of flow passes through the denitrification device 12. With this arrangement, the inside of the denitrification device 12 lacks the absolute amount of the dissolved oxygen, and, as a result, the anaerobic condition can be maintained easily and advantageously, thereby the activity of the anaerobic bacteria is promoted, which, in turn, improves the efficiency of the denitrification treatment.

Thereafter, the rearing water flows through the pipe 9 and into the bubble surfacing device 11, where organic substances (surface active substances), such as fatty acid, protein and the like contained in the water are captured. The bubble surfacing device 11 is a foam fractionator which generates bubbles by supplying the air and/or ozone (a mixture of air and ozone, with a ozone concentration being adjusted to within the range of 0–100%) to the agitating blade, and bubbles are collected on the water surface and discharged out of the water tank by the agitating means. Thus, floating substances such as protein, fats and oils, and the like, which adhere to bubbles while they are surfacing, can be removed with bubbles. With the supply of ozone to the bubble surfacing device, organic substances are decomposed or sterilized, so as to promote purification of the rearing water.

The rearing water in the bubble surfacing device 11 is communicated with a UV disinfection device 13 through the pipe 9. The UV disinfection device 13 irradiates ultraviolet rays to the water to effect the UV disinfection.

The UV disinfection device 13 to perform disinfection of the water with irradiation of UV rays is not limited to perform only such UV disinfection, but it can also decompose ozone, which is contained in the water when ozone is supplied in the bubble surfacing device 11, with irradiation of UV rays. Specifically, when the ozone concentration becomes too high, the aerobic bacteria, which perform nitrification in the ammonium treatment section, are killed, and, in addition, the water becomes highly toxic to fish, so that it obstructs the healthy rearing of fish. But, this can be avoided by decomposing excess ozone with irradiation of UV rays and the ozone concentration can be regulated to an appropriate value.

Although it is not shown in the drawings, it is desirable to provide a sensor at the downstream of the bubble surfacing device 11 to detect the ozone concentration. Namely, by detection of the ozone concentration by this sensor, the supply of ozone in the bubble surface device 11 can be regulated based on a detection result of high or low ozone concentration.

The rearing water which has passed through the bubble surfacing device 11 and the UV disinfection device 13 communicates with a non-immersion treatment device 14 through the pipe 9, and the rearing water in the non-immersion treatment device 14 further communicates with a immersion treatment device 15 through the pipe 9. The non-immersion treatment device 14 and the immersion treatment device 15 constitute the ammonium treatment device in which ammonium contained in the rearing water is subjected to decomposition treatment.

In this embodiment, a pump 16 and an aeration device 17 are disposed in the pipe 9 which communicates between the non-immersion treatment device 14 and the immersion treatment device 15. The aeration device 17 is associated with an oxygen generator 23 which will be described hereinafter.

In this embodiment the non-immersion treatment device 14 uses a rotary bio-contactor consisting of a plurality of disks mounted under a rotating shaft, each disk having on its surface a filtering material (resin and the like) in the form of, for example, a scrubbing brush. Needless to say, the filtering material may be in any other form than the scrubbing brush, including, for example, in sponge, net, fiber, or honey-comb form. Also, a mechanical multi-tank may be used, in place of the rotary bio-contactor. The immersion treatment device 15 uses a fluidized bed filter.

The ammonium contained in the rearing water is decomposed by the aerobic bacteria present in the non-immersion treatment device 14 and the immersion treatment device 15. For example, a fluidized bed filter 18 constituting the immersion treatment device 15 is designed to have a resin pipe filled with a filtering material (for example, quartz sand) in a predetermined thickness and containing the aerobic bacteria therein. Then, the rearing water from the aeration device 17 flows from below the fluidized bed filter 18 to upward, and here the decomposition of ammonium is performed by the bacteria. In this embodiment, since the aeration device 17 is disposed at the upstream of the immersion treatment device 15, a great amount of oxygen is supplied to the water flowing through the fluidized bed filter 18, thereby to enhance the activity of bacteria. A screen filter 19 of coarse meshes than the micro-screen filter may be provided at the downstream of the fluidized bed filter 18, as necessary, to capture sand and bacteria. The screen filter 19 captures sand which flows out of the fluidized bed filter 18, and the sand and bacteria captured here are returned to the fluidized bed filter 18. When the screen filter 19 is not provided, it is preferable to provide a strainer to prevent the sand from flowing out treatment device using the rotary bio-contactor or the mechanical multi-tank, which has a larger contact area with the air, is disposed at the upstream side in the ammonium treatment device to effectively utilize the oxygen contained in the air.

At the downstream side, the immersion treatment device utilizing the fluidized bed filter, which has a greater chance of contacting with the oxygen and bacteria, is provided to effectively treating the ammonium in some lower concentration resulted from the first decomposition performed in the non-immersion treatment device. A heat pump 22 is provided to the pipe 9 communicating with the immersion treatment device 15 and an aeration device 21 in order to keep the water at a temperature suitable to fish being reared. A heat exchanger may be used in place of the heat pump according to the water temperature requirement.

The aeration device 17 is, as described above, to dissolve the oxygen in the water to promote decomposition of ammonium, while the aeration section 21 is to dissolve the oxygen in the water required to keep the fish alive. However, it may not be always necessary to have both aeration sections, but one of them may be omitted, because the oxygen is supplied to the water anyway. In the present embodiment, the oxygen generated by the oxygen generator 23 is supplied to the aeration device 17 and the aeration device 21. A compressor 24 is connected to the oxygen generator 23. The aeration device 17 and the aeration device 21 can achieve dissolving (dissolution) the oxygen in the water effectively by having, for example, a pressure dissolution device. Alternatively, a plurality of U-shaped hollow fiber membranes having a plurality of fine pores are formed in a bundle with both ends being open, and this bundle of hollow fiber membranes is disposed in the communicating pipe. Then, the oxygen is supplied into each hollow fiber membrane to be blown out from fine pores and dissolved in the water. The of the fluidized bed filter 18 and transported to the next step.

Further, a sludge sediment tank 20 may be provided at the downstream of the screen filter 19 as required. In here, the sludge is removed. Also, in the denitrification device 12, a screen filter 12b and a sludge sediment tank 12c may also be provided to meet the necessity, and when these are not provide, it is preferable that a strainer is provided.

Since the ammonium treatment section constituted by the non-immersion treatment device 14 and the immersion treatment device 15 is disposed at the downstream of the bubble surfacing device 11 and the UV disinfection device 13, the rearing water, from which other bacteria than the aerobic bacteria are disinfected, communicates with the ammonium treatment section. Thus, the activity of the aerobic bacteria is not obstructed by oxidization reactions of other bacteria, but sufficiently activated under the aerobic condition so that decomposition treatment of ammonium can be achieved efficiently.

The ammonium is first decomposed to some degree of concentration in the non-immersion treatment device 14, and, subsequently, further decomposed to a lower concentration in the immersion treatment device 15, as described above. In this manner, the ammonium can be decomposed to a lower concentration than the one-stage treatment. Further, since the high purity oxygen is expensive, it is desirable to effectively use the oxygen contained in the air for metabolism of the aerobic bacteria. As described above, even though the rearing water flows through the ammonium treatment device in the state where organic substances have been removed, the rearing water still contains some organic substances inevitably. Then, the amount of oxygen required for oxidization of such organic substances is about 1.5 times the amount of oxygen required for the ammonium decomposition treatment. For this reason, the non-immersion use of the hollow fiber membranes also achieves effective dissolution of the oxygen, and it is less costly than the use of liquid oxygen. It is preferable that the hollow fiber membrane is made of resin of, for example, cellulose type, polyolefine type or polysulfone type, and having a pore size in the range of 0.02–1.0 micro m, a hole ratio in the range of 20–90%, an outer diameter in the range of 0.1–0.5 mm, and a membrane thickness in the range of 10–100 micro m. Instead of the U-shaped bundle of hollow fiber membranes, a bundle of hollow fiber membranes with the ends being sealed may be disposed in the communicating pipe.

In the present embodiment, the two aeration device 17 and 21 are provided as a prevention measure in the case where one of the aeration sections is failed due to some trouble, but the oxygen can still be supplied to keep the fish alive. However, according to the arrangement of the present invention, the quality control of the water in the rearing system can be effectively achieved, even with only one aeration section disposed in the circulation section.

The rearing water in the aeration device 21 is supplied again to the rearing water tank 1 through the pipes.

Although not shown in the drawings, with this embodiment, various measuring devices including an ammonium measuring device, a DO meter for determining the residual oxygen, a flow meter, a residual ozone measuring device, a pH meter and the like are disposed at predetermined locations in the circulation path. The detection data provided by these measuring devices are coupled with the external computer system, and, based on thus obtained information, the required rotation of pump, aeration, temperature and the like are controlled for the rearing system of this embodiment.

As described above, according to the present invention, the rearing system which is capable of performing the water quality control at a low cost by combining equipment and facilities rationally.

INDUSTRIAL APPLICABILITY

The rearing system of the present invention can be worked without regard to the kind of fish or the geographical requirements. The invention is particularly suitable in the case where the rearing in the natural environment is difficult due to weather conditions or geographical requirements.

What is claimed is:

1. A fish rearing system having a water circulation system or discharging the rearing water from a discharge port provided at the bottom of a rearing water tank and resupplying the discharged rearing water to the rearing water tank, the fish rearing system is characterized in that the water circulation system comprising:

a trapping device for capturing residual feed and fish feces contained in the rearing water, a residual feed detecting sensor for detecting the residual feed contained in the rearing water, a denitrification device for performing denitrification of nitrogen compound contained in the rearing water, a bubble surfacing device for generating bubbles by supplying air and/or ozone and removing surface active substances by capturing the generated bubbles, an ultraviolet disinfection device for disinfecting the circulating rearing water, an ammonium treatment device for decomposing ammonium contained in the rearing water, and an aeration device for dissolving oxygen into the rearing water, and wherein the denitrification device is disposed at the upstream of the bubble surfacing device and in a circulation path branched out from a main circulation path.

2. A fish rearing system according to claim 1, wherein the ammonium treatment device is disposed at the downstream of the bubble surfacing device and consisting of two treatment device of a immersion treatment device and a non-immersion treatment device.

3. A fish rearing system according to claim 1, wherein the trapping device comprising a particle trap for accumulating sediments of residual feed and fish feces, a sediment trap for separating the sediment from the water flowing-in from a circulation path branched out from the particle trap, and a filter section for capturing fine residual feed and less fine residual feed which have escaped from the capture by the particle trap and the sediment trap, and, the residual feed detecting sensor is an ultrasonic sensor, said sensor is disposed at the upstream of the sediment trap and interposed in the circulation path branched out from the particle trap and communicating with the sediment trap.

4. A fish rearing system according to claim 2, wherein the denitrification device and the immersion treatment device each having a fluidized bed filter, the non-immersion treatment device having a rotary bio-contactor, and the aeration device having a pressure oxygen dissolving device.

5. A fish rearing system according to claim 2, wherein the denitrification device and the immersion treatment device each having the fluidized bed filter, the non-immersion treatment device having the rotary bio-contactor, and the aeration device having a hollow fiber membrane module.

6. A fish rearing system according to claim 1, wherein the ultraviolet disinfection device is disposed at the downstream of the bubble surfacing device.

* * * * *